United States Patent
Levesque et al.

(10) Patent No.: US 10,331,624 B2
(45) Date of Patent: Jun. 25, 2019

(54) AUTOMATED DATA CLASSIFICATION SYSTEM

(71) Applicant: TRANSITIVE INNOVATION, LLC, Newport, RI (US)

(72) Inventors: Tyler G. Levesque, West Warwick, RI (US); Michael E. Levesque, Newport, RI (US)

(73) Assignee: TRANSITIVE INNOVATION, LLC, Newport, RI (US)

( * ) Notice: Subject to any disclaimer, the term of this patent is extended or adjusted under 35 U.S.C. 154(b) by 0 days.

(21) Appl. No.: 15/449,098

(22) Filed: Mar. 3, 2017

(65) Prior Publication Data

US 2018/0253441 A1    Sep. 6, 2018

(51) Int. Cl.
| | |
|---|---|
| *G06F 7/00* | (2006.01) |
| *G06F 17/30* | (2006.01) |
| *G06F 16/17* | (2019.01) |
| *G06F 16/13* | (2019.01) |
| *G06F 16/16* | (2019.01) |
| *G06F 16/904* | (2019.01) |
| *G06F 16/907* | (2019.01) |

(52) U.S. Cl.
CPC .............. *G06F 16/17* (2019.01); *G06F 16/13* (2019.01); *G06F 16/162* (2019.01); *G06F 16/164* (2019.01); *G06F 16/168* (2019.01); *G06F 16/904* (2019.01); *G06F 16/907* (2019.01)

(58) Field of Classification Search
CPC ................ G06F 17/30864; G06F 17/30943
See application file for complete search history.

(56) References Cited

U.S. PATENT DOCUMENTS

| | | | |
|---|---|---|---|
| 6,236,996 B1 * | 5/2001 | Bapat ..................... | G06F 1/00 |
| 6,507,911 B1 | 1/2003 | Langford | |
| 7,171,532 B2 | 1/2007 | Kodama | |
| 7,343,453 B2 | 3/2008 | Prahlad et al. | |
| 7,523,869 B2 | 4/2009 | Helkio et al. | |
| 7,529,784 B2 | 5/2009 | Kavuri et al. | |
| 7,657,550 B2 | 2/2010 | Prahlad et al. | |
| 8,284,198 B1 | 10/2012 | Hackworth et al. | |

(Continued)

FOREIGN PATENT DOCUMENTS

| | | |
|---|---|---|
| EP | 1 209 556 | 5/2002 |
| EP | 2 567 321 | 7/2014 |

OTHER PUBLICATIONS

DiskBoss—Bulk File Delete and Data Wiping; date of download: May 22, 2017.

(Continued)

*Primary Examiner* — Hasanul Mobin
(74) *Attorney, Agent, or Firm* — Polsinelli LLP

(57) ABSTRACT

The present disclosure relates to methods and apparatus where a user may enter information into a computing device that may allow the computing device to classify data or files that are stored on one or more computing devices to be quickly classified. Methods and systems consistent with the present disclosure allow a user to identify data by a type of data or file and provide classification information such that the computing device may identify data by the data type and to classify that data automatically according to a rule. The information entered by a user that wishes to classify stored data may be entered over a graphical user interface (GUI) at a user device.

19 Claims, 9 Drawing Sheets

(56) References Cited

U.S. PATENT DOCUMENTS

| | | | |
|---|---|---|---|
| 8,402,069 B2 | 3/2013 | Rajaram et al. | |
| 8,650,166 B1* | 2/2014 | Cook | G06F 16/164 |
| | | | 707/694 |
| 8,745,091 B2 | 6/2014 | McHenry et al. | |
| 8,849,768 B1* | 9/2014 | Agrawal | G06F 3/0641 |
| | | | 707/664 |
| 8,918,439 B2 | 12/2014 | Alatorre et al. | |
| 9,098,538 B2 | 8/2015 | Bansode et al. | |
| 9,378,265 B2 | 6/2016 | McHenry et al. | |
| 2003/0105736 A1* | 6/2003 | Gordon | G06F 16/35 |
| 2003/0172094 A1 | 9/2003 | Lauria et al. | |
| 2005/0251510 A1* | 11/2005 | Billingsley | G06F 17/30864 |
| 2006/0167942 A1* | 7/2006 | Lucas | G06F 16/904 |
| 2007/0288861 A1 | 12/2007 | Tabellion et al. | |
| 2008/0263029 A1 | 10/2008 | Guha et al. | |
| 2008/0312906 A1* | 12/2008 | Balchandran | G06F 17/30705 |
| | | | 704/9 |
| 2009/0192979 A1* | 7/2009 | Lunde | G06F 11/1461 |
| 2010/0030781 A1* | 2/2010 | Wong | G06F 21/6227 |
| | | | 707/783 |
| 2010/0099393 A1 | 4/2010 | Brisebois et al. | |
| 2010/0169594 A1 | 7/2010 | Tsaur et al. | |
| 2011/0161376 A1* | 6/2011 | Dickson | G06F 8/71 |
| | | | 707/803 |
| 2013/0297604 A1 | 11/2013 | Sutedja et al. | |
| 2013/0326277 A1 | 12/2013 | Supplisson et al. | |
| 2014/0109176 A1 | 4/2014 | Barton et al. | |
| 2014/0122987 A1* | 5/2014 | Eigner | H04L 67/30 |
| | | | 715/224 |
| 2014/0136486 A1 | 5/2014 | Roy et al. | |
| 2014/0289190 A1* | 9/2014 | Chan | G06F 9/54 |
| | | | 707/610 |
| 2014/0324825 A1* | 10/2014 | Gopinath | G06F 17/30705 |
| | | | 707/722 |
| 2015/0128056 A1 | 5/2015 | Rizzi et al. | |
| 2015/0143064 A1 | 5/2015 | Bhargava et al. | |
| 2015/0199367 A1 | 7/2015 | Hammer et al. | |
| 2016/0041997 A1 | 2/2016 | Gokhale et al. | |
| 2016/0077725 A1 | 3/2016 | Maeda | |
| 2017/0046374 A1 | 2/2017 | Fletcher et al. | |
| 2018/0253218 A1 | 9/2018 | Levesque | |
| 2018/0253440 A1 | 9/2018 | Levesque | |

OTHER PUBLICATIONS

File Juggler keeps your files organized, www.filejuggler.com; date of download: May 22, 2017.
http://s3browser.com/amazon-s3-object-expiration.aspx; date of download: May 22, 2017.
U.S. Appl. No. 15/448,970 Office Action dated May 11, 2017.
U.S. Appl. No. 15/449,064 Office Action dated Jun. 23, 2017.
U.S. Appl. No. 15/448,970 Final Office Action dated Aug. 31, 2017.
U.S. Appl. No. 15/448,970, Michael E. Levesque, Holistic User Interface, filed Mar. 3, 2017.
U.S. Appl. No. 15/449,064, Tyler G. Levesque, User Initiated and Automatic Conditional Deletion, filed Mar. 3, 2017.
U.S. Appl. No. 15/449,064 Final Office Action dated Dec. 11, 2017.
U.S. Appl. No. 15/448,970 Office Action dated Nov. 7, 2018.
U.S. Appl. No. 15/449,064 Office Action dated Oct. 19, 2018.

* cited by examiner

AUTOMATED DATA CLASSIFICATION SYSTEM

BACKGROUND OF THE INVENTION

Field of the Invention

The present invention is generally directed to systems and methods setting policies regarding how data will or could be stored. More specifically, the present invention provides a user the ability to set settings relating to how their data will be stored and possibly deleted over multiple devices with a single software module. The present invention provides a user the ability to set choices of how to store and possibly delete their data with many choices of filtering, such as over time according to the settings.

Description of the Related Art

Today, methods and systems classifying user data are limited. Typically when a file is created it is created in a particular common format type for storage. For example, documents created using Microsoft Word™ will typically correspond to a file type of .doc or .docx. After a user has created various files of different types, they may store those files in one or more directories that may be searched for files that have certain names or that are of a certain type. With the proliferation of electronic equipment, user data may be stored at various different personal devices or at storage resources that are provided by a service provider that stores data for customers. As the number of electronic devices that are associated with a user increase and as an amount of data stored on those electronic devices increase, users will find it more difficult to identify and classify data such that it can be organized or found quickly. Data that is not stored in a computer file as described above can also be a challenge to classify. Such data may originate from other computing devices, cameras, sensors, or other devices. Data classification poses a challenge for these data types as well.

Once data has been created, users wishing to access it may not be able to find it. This is especially true in instances when data is spread out over numerous devices. Given this, user's wishing to find data could benefit from methods and systems that allow a user to quickly classify or find data or file information from one or more electronic devices. What are needed are systems and methods that allow a user to quickly classify or find data that has been stored previously.

SUMMARY OF THE PRESENTLY CLAIMED INVENTION

The presently claimed invention relates to apparatus, methods, and non-transitory computer readable storage mediums that allow a user to classify files or data of a user or of an entity. A method of the presently claimed invention may include receiving user input over a user interface at a user device. The received user input may include a data or file type and a classification that may be used to classify data or files according to a rule. After the user input is received, data or files of the data or file type may be identified and those identified data or file types may be associated with the data or file type according to the rule. After data or files of the data or file type have been associated according to the rule, information relating to the association may be stored persistently in a memory.

When the method of the presently claimed invention is performed by as a non-transitory computer readable storage medium, a processor executing instructions out of a memory may receive user input via a user interface at a user device. The received user input may include a data or file type and a classification that may be used to classify data or files according to a rule. After the user input is received, data or files of the data or file type may be identified and those identified data or file types may be associated with the data or file type according to the rule. After data or files of the data or file type have been associated according to the rule, information relating to the association may be stored persistently.

Apparatus consistent with the presently claimed invention may include a processor that executes program code out of a memory and a display that may display a user interface for receiving user input. The received user input may include a data or file type and a classification that may be used to classify data or files according to a rule. After the user input is received, data or files of the data or file type may be identified and those identified data or file types may be associated with the data or file type according to the rule. After data or files of the file type have been associated according to the rule, information relating to the association may be stored persistently.

DETAILED DESCRIPTION

The present disclosure relates to methods and apparatus where a user may enter information into a computing device that may allow the computing device to classify data or files that are stored on one or more computing devices that need to be quickly classified. Methods and systems consistent with the present disclosure allow a user to identify data by a type of data or file and provide classification information such that the computing device may identify data by the data type and to classify that data automatically according to a rule. The information entered by a user that wishes to classify stored data may be entered over a user interface (UI) at a user device.

Figure 1:
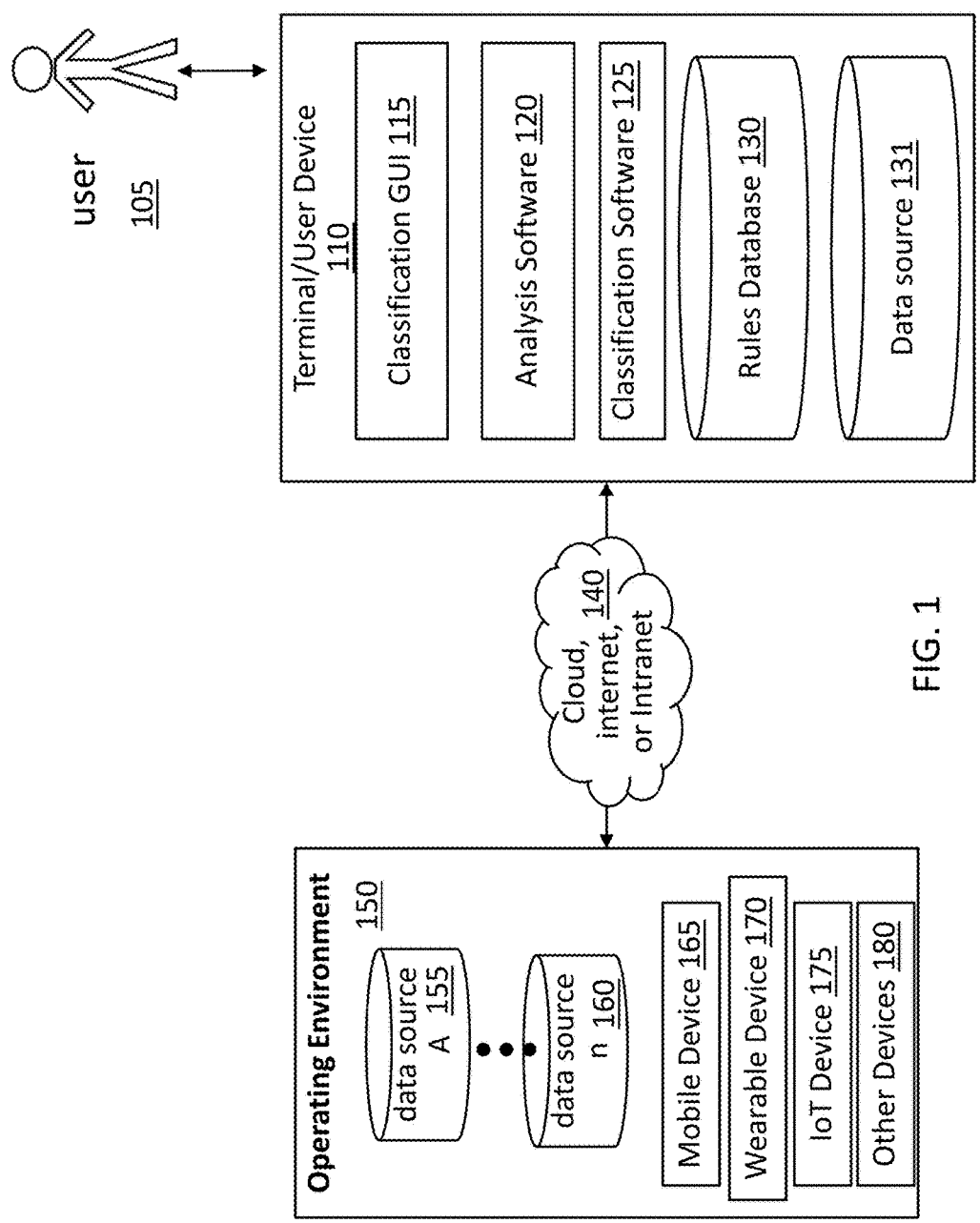
FIG. 1 illustrates an exemplary user device or electronic terminal that allows a user to classify data or files that are stored at one or more electronic devices.

FIG. 1 illustrates an exemplary user device or electronic terminal that allows a user to classify data or files that are stored at one or more electronic devices. FIG. 1 includes a user 105 interacting with terminal/user device 110 over a user interface when organizing data from various devices of operating environment 150. User or terminal/user device 110 of FIG. 1 includes classification graphical user interface (GUI) 115, analysis software 120, and classification software 125, and a rules database 130 and a data source 131. Terminal/user device 110 may communicate with one or more external electronic devices of operating environment 150 via a computer network interface. The terminal/user device 110 may be a desktop or laptop with the ability to have a large screen and keyboard to take advantage of the viewing and interacting with the apparatus and method Graphical User interface. However, the terminal/user device 110 may also be any interactive device. User/terminal device 110 of FIG. 1 may be a desktop or laptop which allows a user to connect to the cloud, internet, or other connection schema 140 to then attach to other devices. It should be obvious to those skilled in the art that a user can attach to any device that may have (smartphone mobile device, wearable device, cloud storage device, IOT device, or other device(s)) and the each have their own Applications and API to exchange commands to view data and to delete data. User or terminal device 110 of FIG. 1 base software 130 manages the other software modules. It should be noted that data source 131 is the User or terminal device 110 of FIG. 1 data storage itself, which is locally accessed. Data Source 131 is Terminal/User device 110 storage which may be disk drives, solid state drives, flash drives, etc. Terminal As such, user device 110 may communicate over an intranet, an Internet connection, or communicate with storage resources located in the Cloud 140 when data or files are classified. Operating Environment 150 illustrates a plurality of data sources, such as: data source A 155 through data source N 160, mobile device 165, wearable device 170, Internet of Things (IoT) device 175, or other devices 180. Apparatus and methods consistent with the present disclosure may allow a user to enter information over a user interface when data is classified according to settings or inputs received via classification GUI 115.

Operating environment is defined as the collection of data sources accessed by the Terminal/User interface 110 in that, by the terminal/user interface 110 can link to external devices, and any of those externally devices are considered the operating environment 150. Analysis software 120 or classification software 125 does not show the specifics of how these external devices and data sources are linked to create the operating environment 150, but is should be obvious to those skilled in the art that these are device settings to connect via URL connections, cellular, or other connection schema.

Note that devices in operating environment 150 may be a combination of devices that are owned by a particular user or that may be owned by a company that stores data for the user. For example, data sources A 155 & B 160 may be data storage devices in a data center located in the Cloud that is operated by a company. Mobile device 165 and wearable device 170 are examples of devices that may be owned by a user.

Apparatus and methods consistent with the present disclosure allow a user to enter settings set over a single user interface at a single device that affect policies or rules regarding how that data may be classified.

Figure 2:
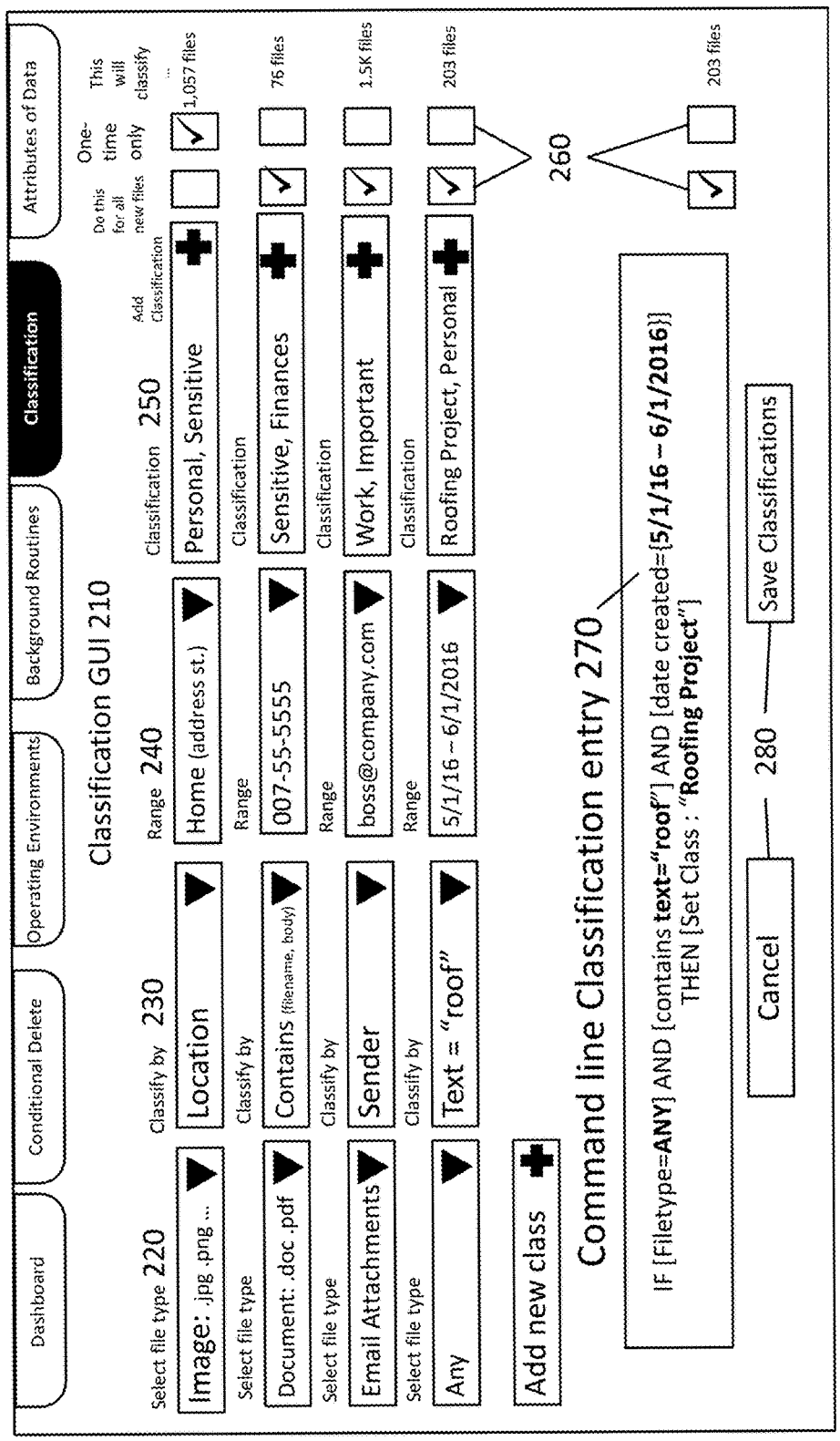
FIG. 2 illustrates an exemplary user interface consistent with the present disclosure.

FIG. 2 illustrates an exemplary user interface consistent with the present disclosure. A classification GUI 210 of FIG. 2 includes a set of selection boxes 220 where a type of a data or file may be selected, a group of selection boxes that identify how a selected type of data or file may be classified 230, a set of range selection boxes 240, and a group of selection boxes that may be used to classify particular types of data or files 250. FIG. 2 includes check boxes 260 that allows a user to identify whether certain types of data or files should be classified any time a particular type of data or file is created/updated (i.e. "do this for all new data or files") or whether this classification should be performed "one-time only." FIG. 2 also includes an entry box where a command line classification may be specified via a written command. FIG. 2 also includes selection boxes 280 that may be used to cancel or save entries or selections that have been entered in classification GUI 210.

Note that the file type 220, the classify by 230, the range 240, and the classification 250 selection boxes of FIG. 2 are arranged like columns in a "table." Note also, that a first row of this "table" of FIG. 2 identifies an image file type, that file types of "image" should be classified by location, that a range associated with the image file type is a home address, and that a classification associated with the image file type are personal/sensitive.

The "classify by" 230 and range 240 inputs or settings are metrics that systems and methods consistent with the present disclosure may use when user data or files are classified. In certain instances, these metrics may correspond to one or more parameters that may be used to associate user data with a primary classification or with a secondary sub-classification.

A second row included in the table of classification GUI 210 identifies a document file type, indicates that file types of "image" should be classified by content (i.e. a filename or content included in the body of a document), identifies that a range associated with the document file type corresponds to a number of 007-55-5555, and identifies that a classification associated with the image document file type relates to sensitive financial information. As such, this second row of the table of classification GUI 210 may correspond to tax information where the range number may be a social security number.

A third row included in the table of classification GUI 210 identifies: an email file/data type, that file/data types of email should be classified by a sender of the email, that a range associated with the email file type corresponds to an email address of boss@company.com, and that the classification associated with file/data is work/important.

A fourth row included in the table of classification GUI 210 identifies: an "any" file/data type, that "any" types of "any" should be classified by "text" of "roof" that corresponds to a roofing project, that a range associated with the "any" file type corresponds to a range of dates from 5/1/2016 to 6/1/2016, and that the classification associated with "any" file type is a personal roofing project.

A command line classification entry box 270 includes an if-then command of: IF a file type="any" file type AND if a "classify by" field that corresponds to the "any" file type AND a creating date is between 5/1/16 and 6-1-16, THEN any file created between May 1, 2016 and Jun. 1, 2016 that is associated with the text of "roof." Data or files that correspond to such an if-then command, may be classified as being associated with the personal "roofing project" that occurred between May 1, 2016 and Jun. 1, 2016.

Each of the rows of the table of classification GUI 210 discussed above and the command line classification entry box 270 of FIG. 2 also may be associated with a "do this for all new files" check box and with a "one-time only" check box. In instances where the "do this for all new files" check box is selected, files or data that are associated with certain file types will be classified according to selections or entries that correspond to a "classify by" selection/entry 230, a range 240 selecting/entry, and a classification selection/entry 250 whenever a data or file of an identified type is commanded. In instances where "one time only" check box is selected, file or data that are associated with certain file types will be classified according to selections or entries that correspond to a "classify by" selection/entry 230, a range 240 selecting/entry, and a classification 250 selection/entry once only.

Note that FIG. 2 also includes a selection box of "add new class." When the "add new class" selection button is selected, a new row of entries may be opened in the table of classification GUI 210. Once a new row is opened in the classification GUI, a user of may make a new set of entries that may be used to cross reference one or more specific file types with a "classify by" category, a range, and a classification.

FIG. 2 also includes selection boxes of cancel and save classifications. When the cancel selection button is selected, entries made in the classification GUI 210 will be cancelled. When the save classifications button is selected classifications entered in the classification GUI 210 will be persistently saved.

Notice also that FIG. 2 includes various selection tabs of dashboard, conditional delete, operating environments, background routines, configuration, and data attributes. Note also of these selection tabs that "classification" is selected as indicated by the classification tab being black.

Not shown, it should be obvious to those skilled in the art, that the command line can be parsed according to a parsing program. Each parsed parameter (e.g. "filetype=ANY") is passed logically to its resultant execution program (that is, find filetype") and the resultant execution result (e.g. "contains text=roof" and a logical out put that then executes (if the parsed operator is an "AND" then the next parsed parameter (e.g. "date created 5/16/16 to 6/2016") and the execution see a "set class=Roofing Project". The command line is satisfied and the command line executes the command. In this way any command line can be written to initiate parsed parameters and logical operators and execution of the command line rule. It should be obvious to those skilled in the art that any rule of any complexity can be written as is known in the art related to storage management.

The classification delete GUI 210 allows the user to set data or file types 220, classify type 230, range types 240, and classification types 350. However, classification GUI 210 allows for a separate unique command line operation that allows for any rule that may not simply be a set of filters such as those set by user to set thresholds types. For instance, a command line can include parsed data that is not in the set of filters, such as, IF {[Filetype=pdf] AND File="has not been accessed" FOR [date>1/1/2013] then "Do NOT Classify"]}. This rule is not selectable by filter selections but utilizes the system complexities as it is well known to be able to check filetype and the date accessed and it is well known to stop a classification rules from execution. In this way, a command line is used for more complex classification management.

Figure 3:
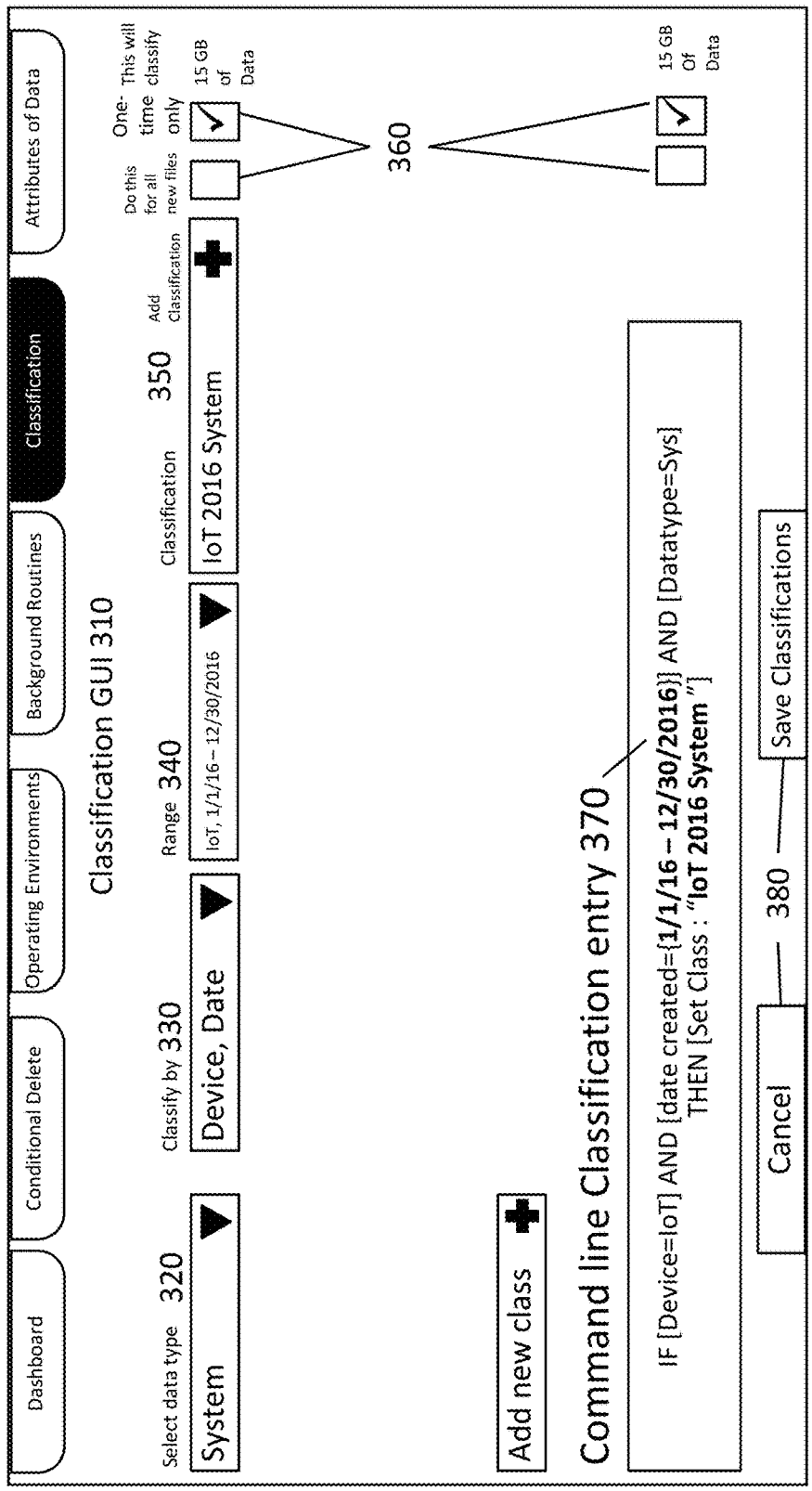
FIG. 3 illustrates an exemplary GUI that a user may use when setting entries that classify particular data types.

FIG. 3 illustrates an exemplary GUI that a user may use when setting entries that classify particular data types. The classification GUI of FIG. 3 includes a "select data type" selection box 320, a "classify by" selection box 330, a "range" selection/data entry box 340, and a "classification" selection/data entry box 350. FIG. 3 also includes a command line classification entry box 370, a "add new class" selection box, and check boxes 360. Note that the check boxes 360 of FIG. 3 include a "do this for all new data/files" check box and a "one time only" check box that may be used when classifications are set and saved in classification GUI 310. FIG. 3 also includes selection boxes of cancel and save classification entries.

The classification GUI of FIG. 3 may be used in a similar manner as the classification GUI 210 of FIG. 2 that was previously discussed. Note that "system" is selected in the "select data type" selection box 320, that "device, date" is selected in the "classify by" selection box 330, that IoT 1/1/16-12/30/16 has been entered in the "range" selection/data entry box 340, and that IoT 2016 is entered in the classification selection box 350. These selections may allow data associated with a particular system that was created on a date between date range 1/1/16 and 12/30/16 to be classified as IoT system of the 2016 calendar year data. Alternatively, and not shown, but should be obvious to those skilled in the art, in the example of an IoT sensor a temporal range could be defined by user specified ranges that span from microseconds to years, or any other ranges appropriate to the application.

Note that the command line in the command line classification entry 370 will classify data type associated with an IoT device. This command line identifies the if-then command of IF a device=IoT device AND if data associated with that IoT device was created between 1/1/16 and 12/30/16 AND if a data type associated with this IoT device was "Sys" (system), then data associated with data type "Sys" that was created during calendar year 2016 will be classified as IoT 2016 system data.

Figure 4:
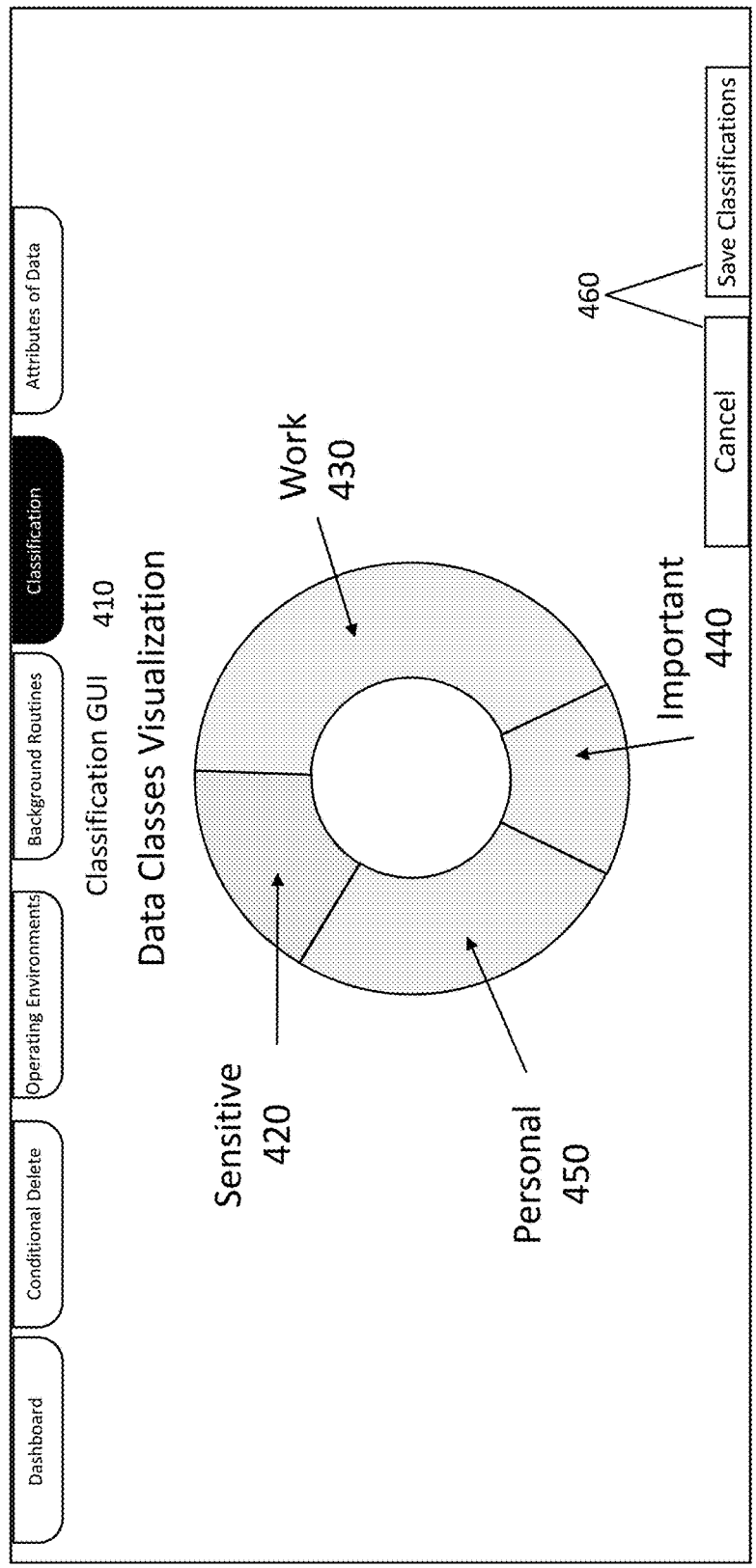
FIG. 4 illustrates an exemplary classification GUI consistent with the present disclosure.

FIG. 4 illustrates an exemplary classification GUI consistent with the present disclosure. The classification GUI 410 of FIG. 4 includes a circular visualization that depicts amounts of data with different classifications. Not shown was classifications of data into sensitive, personal, work, important. FIG. 4 shows a visualization of that classification. The amounts of data illustrated in FIG. 4 may correspond to a number of bytes of one or more data elements or files that have been classified with a particular classification. Alternatively, the amounts of data illustrated in FIG. 4 may correspond to a number of files that have been classified with a particular classification. Note that classifications included in FIG. 4 are "sensitive" 420, "work" 430, "important" 440, and "personal" 450. By viewing the chart of visualizations by data class of classification GUI 410, a user may identify how much data or how many files are used to store data that have been assigned certain specific classifications of "sensitive" 420, "work" 430, "important" 440, and "personal" 450.

FIG. 4 also includes selection boxes 460 of cancel and save classifications that may be used to cancel or save certain specific classifications initially set by a user. In certain instances, a user entering information into a user interface like the GUIs of FIGS. 2 & 3 may view the visualizations of FIG. 4 before a user has saved those classifications.

Figure 5:
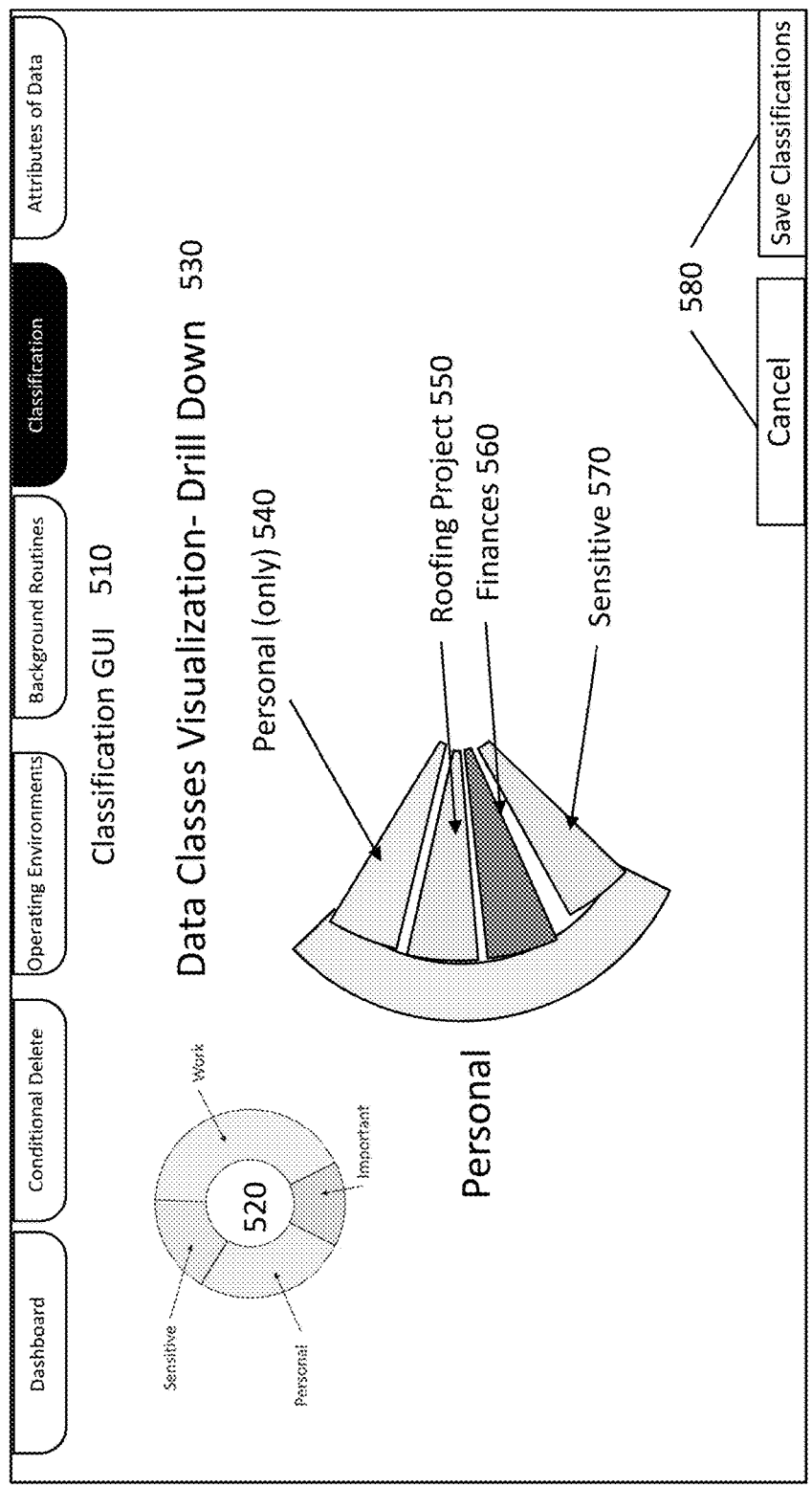
FIG. 5 illustrates another exemplary classification GUI consistent with the present disclosure.

FIG. 5 illustrates another exemplary classification GUI consistent with the present disclosure. The classification GUI 510 of FIG. 5 includes the visualization chart 520 like that of FIG. 4, and includes a drilled down data class visualization 530. The drilled down data class visualization 530 is a pie chart of sub-classifications that may be associated with a primary classification of "personal." Note that these "sub-classifications" include "personal (only)" 540, "roofing project" 550, "finances" 560, and "sensitive" 570. As such, data or files of the present disclosure may be associated with a main/primary classification and a sub-classification.

FIG. 5 also includes selection boxes 580 of cancel and save classifications that may be used to cancel or save certain specific classifications initially set by a user.

Figure 6:
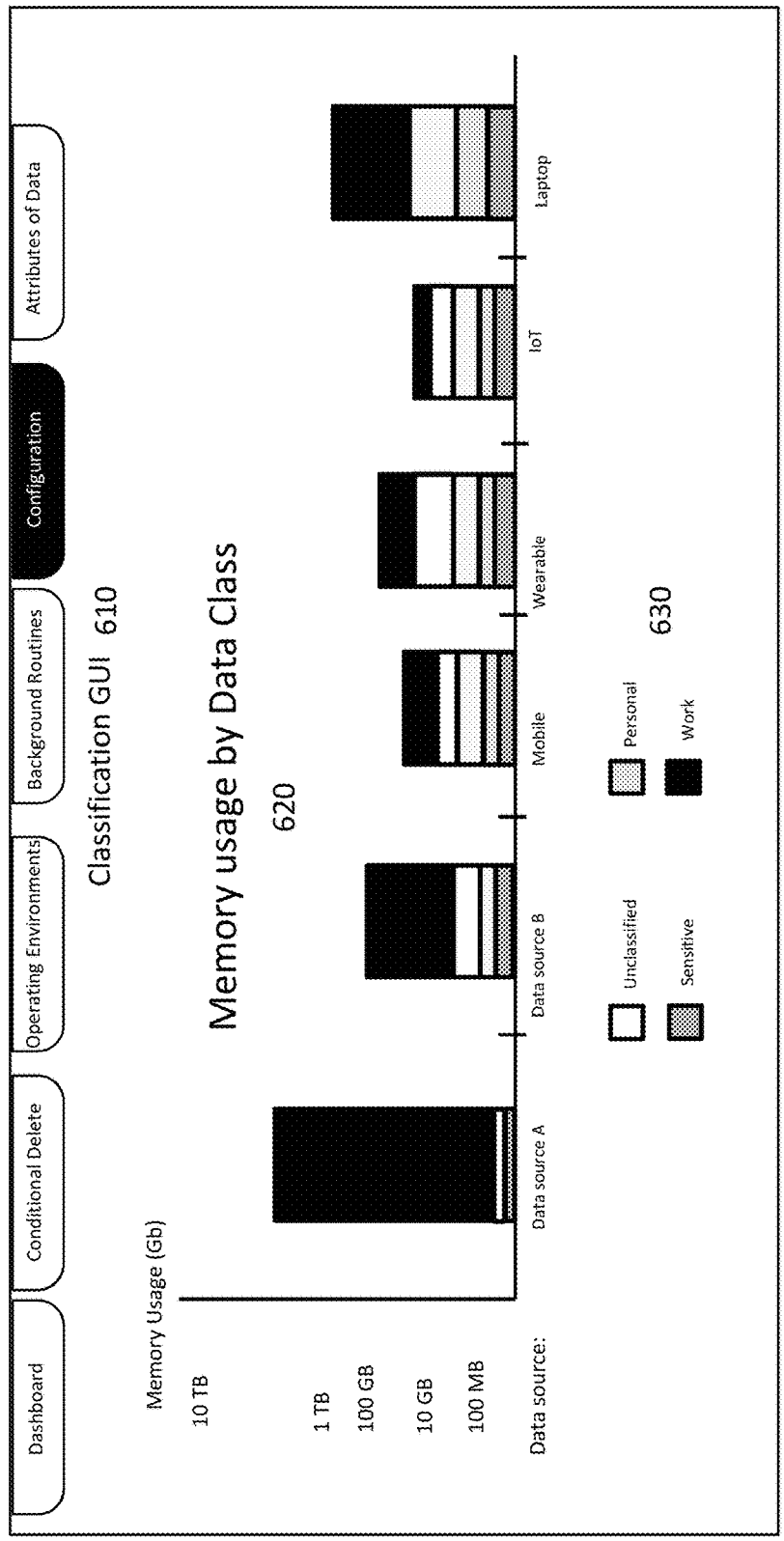
FIG. 6 illustrates an exemplary bar chart of data of different types that may be associated with a classification consistent with the present disclosure.

FIG. 6 illustrates an exemplary bar chart of data of different types that may be associated with a classification consistent with the present disclosure. The classification GUI 610 of FIG. 6 includes a memory usage by data class bar chart 620 and various different classifications 630 that may be associated with data or files stored on different devices. The various different classifications of data 630 include "unclassified," "sensitive," "personal," and "work."

Note that the data class bar chart 620 of FIG. 6 includes a vertical axis of memory usage and a horizontal axis that identifies different data sources. The different data sources included in the bar chart 620 are "data source A," "data source B," a "mobile" device, a "wearable" device, and "IoT" device, and a "laptop." Apparatus and methods consistent with the present disclosure may, thus be used to classify types of files or data on different devices and may be used to view how much data (in bytes, megabytes MB, gigabytes GB, in terabytes TB, or in numbers of files or data elements) of different classifications are stored on different devices. Note that "data source A" includes mostly data that has been classified as being "work" related.

The various GUI'S of the present disclosure may also be used to classify data that resides on a plurality of different devices whether those different devices belong to a user or whether some of those devices belong to a company, such as a company that allows customers to store data on a server on the Internet, on an intranet, in the Cloud, or on other connected devices.

Figure 7:
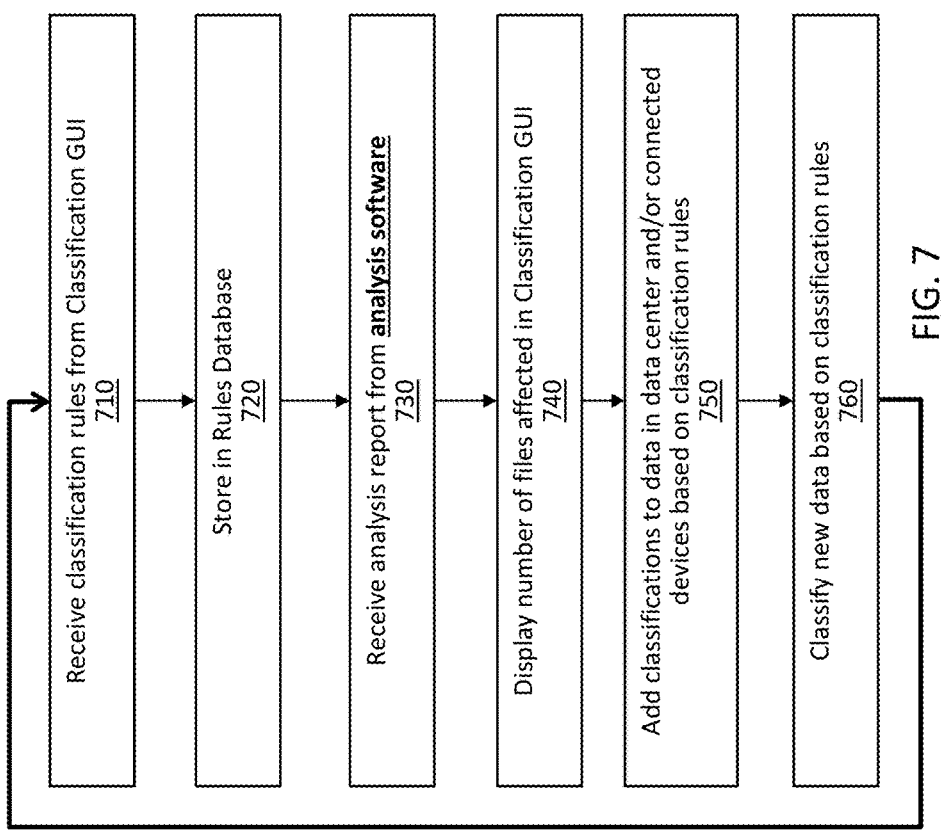
FIG. 7 illustrates an exemplary flow chart of program flow that is consistent with a classification software module of the present disclosure.

FIG. 7 illustrates an exemplary flow chart of Classification Software 125 of FIG. 1 of program flow. Step 710 of the flow chart of FIG. 7 receives classification rules from a classification GUI. Next step 720 of the flow chart of FIG. 7 may store the received classification rules in a database. Then in step 730, an analysis is report may be received from a software module that analyzes data stored at one or more devices when identifying classifications that may be associated with data or files that are stored at the one or more devices. Step 730 essentially initiates the analysis software of FIG. 8.

Step 740 of the flow chart of FIG. 7 may then display a number of files that are affected by particular classification settings in a classification GUI. Next step 750 may add or update classification information to files that reside on one or more electronic devices. These classifications may be added to meta-data that is associated with the files that have been classified or re-classified and that classification information may be stored at an electronic device that also stores the classified files. As such, meta-data associated with files stored at a data center or that are stored to other electronic devices may be updated with new or updated classification information or rules.

Finally in step 760 of FIG. 7, any data or files may be classified or re-classified based on the new classification rules.

Figure 8:
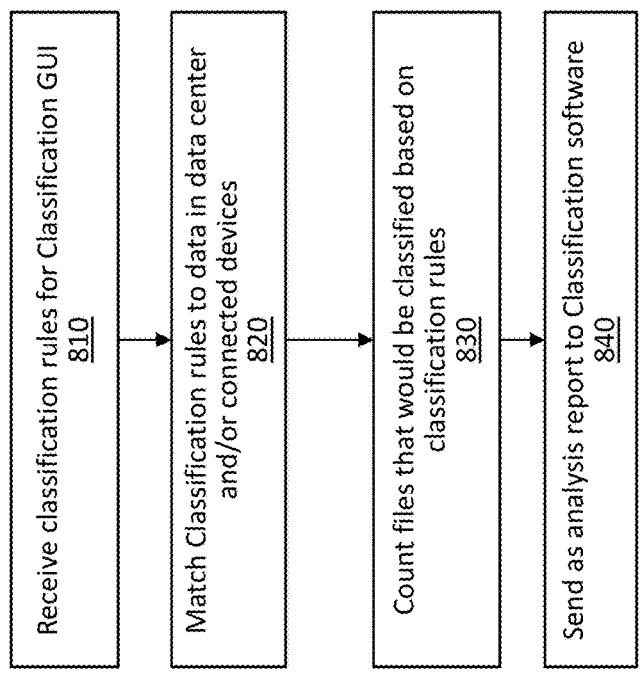
FIG. 8 illustrates an exemplary flow chart that may be associated with an analysis software module consistent with the present disclosure.

FIG. 8 illustrates an exemplary flow chart that may be associated with an analysis software 120 of FIG. 2 consistent with the present disclosure. The analysis software module of FIG. 8 begins with step 810 that receives classification rules via a classification GUI. Step 820 of FIG. 8 may then match the received classification rules with data or files stored at a data center or at particular user devices. Then in step 830 of FIG. 8 a number of data items or files that are associated with particular classification rules may be counted. After the number of data items or files that are associated with particular classification rules are counted, a report that summarizes those classification rules may be sent to the classification software module of FIG. 7, where the classification software modules may use information in that report when preparing to display information to a user in a GUI.

A user entering information into a GUI consistent with the present disclosure may enter information that identifies a plurality of electronic devices that store data for a user or for an entity. The information identifying the plurality of electronic devices may include one or more of, but is not limited to, an internet protocol (IP) address, a phone number, a domain name, or a universal resource locator (URL).

Embodiments of the present disclosure may include different levels of deletion that may be coupled to different security levels or to different levels of secure erase. Such levels of deletion may simply deallocate blocks of memory that are associated with a file when that file is deleted or may overwrite file data by writing data patterns to memory blocks associated with the file when that file is deleted.

Commonly when files are deleted in a computing device, memory blocks that were used to store the file data are simply deallocated by changing entries in a file system. When this occurs, the memory blocks that were used store the file data still store that file data until those memory blocks are overwritten when another file is stored at that computing device. Because of this, data deleted by simply deallocating memory blocks may be recovered by reading those memory blocks, for example, by using utilities that bypass the file system of the computing device. In certain instances, conventional computing devices delete files by move a file identifier to a "recycle bin" where they may be "recovered" with by a user making a selection. As such, conventional deletion mechanisms are inherently insecure.

Another reason for including different levels of deletion in the design of a computing device relate to the fact that sometimes overwritten data may be recovered using advanced computer forensic techniques. In order to provide maximum levels of security, memory blocks used to store file data may be overwritten multiple times with one or more different data patterns during a secure erase operation. Such data patterns may include alternating ones and zeros or other patterns, such as following the write of alternating one and zeros with alternating zeros and ones.

In certain instances a level or type of deletion may selected by a user of a computing device. For example, this may be accomplished by a user selecting one or more entries in a GUI that is associated with a user's electronic device. In such instances a user may be able to select a number of overwrites used when a secure erase operation is performed.

Alternatively or additionally, file data may be automatically be securely erased (i.e. overwritten) to an appropriate level automatically. Such erasures may be based on a file type, be related to a type of computing device, correspond to a location where the deleted data was originally sourced from, be related to locations where the computing device currently resides, or be related to another association that corresponds to a security level. As such, levels of deletion may relate to security levels where processes related to deleting file data may vary based on one or more security associations and/or location information. Exemplary security levels may correspond to one or more levels identified by the National Security Agency.

Classification of various different data elements or files may correspond to a "Proprietary," a "Confidential," a "Secret," a "Top Secret," or others, which include but is not limited to a "User-defined" level of classification, where deleting data that has a "Top Secret" classification may be deled using a more extensive deletion process than processes associated with deleting data that has a "Secret," a "Confidential," or a "Proprietary" classification.

In certain instances, data may also be deleted that is related to a first file that has been scheduled for deletion. In such instances, a second file that belongs to a same user, a same user group, or of a certain type that has not been explicitly identified by the first rule for deletion may be deleted based on the second rule that associates the first file with the second file.

Data may be deleted from a computing device after a security breach has been identified. In such instances, a software program executing at a computing device may be used to detect security breaches. Embodiments of the present disclosure may be either loosely or tightly integrated with various Security Software capabilities that detect/identify security breaches, for the purpose of coupling the discrete capabilities and enabling the integrated capability to perform a conditional deletion after a security breach has been identified. After a security breach is identified, data may be deleted from the computing device based on the identified security breach according to one or more settings. The conditional deletion may be performed after a user has responded to a System Prompt identifying that a security breach has occurred, or it may be automated based on one or more established rules. In other instances data may be deleted automatically based on a rule set by a supervising authority. Conditions and rules used to identify data identified or a message may be displayed in a GUI at a user device that has been breached by a security threat.

Conditional retention and deletion rules may also correspond to requirements identified by government agencies, such as, but not limited to, the Federal Drug Administration (FDA), the Environmental Protection Agency (EPA), the Veterans Administration (VA), or the Center for Disease Control (CDC), the Department of Defense (DoD), Department of Homeland Security (DHS), or the Intelligence Community (IC).

Embodiments of the present disclosure may execute periodically according to a schedule rather than running continuously. For example, settings set in a GUI may conditionally delete data once every six months.

In instances when data retention thresholds are enforced at a user device, they may be enforced according to a set of static rules or according to a set of dynamic conditions. Examples of static conditional deletion rules include deleting some customer file data when customer files exceed a threshold of 500 MB or deleting music data files when music files exceed a threshold size of 4 GB. An example of dynamic data retention thresholds may cause certain files to be deleted when they reach or cross a threshold size. As such, dynamic rules could cause data of certain types to be deleted when greater than 60% of a total amount of memory is used.

Conditional retention or deletion rules may be based on a privilege or security level. For example, the setting of conditional retention and deletion rules may require that a user be a supervisor or an administrator to change conditional deletion settings where general employees are prohibited from making such changes.

Conditional retention and deletion rules may also be used identify properties of certain files that may be displayed in a GUI consistent with the present disclosure. In certain instances, such properties may identify or be related to an owner of a file, correspond to a user of certain data types, or may include information that identifies where certain data originated. Information that identifies where certain data originated may include specific information about the device (e.g. mobile device, sensor, etc.) that originated the data, such as the type of device, manufacturer of device, model number of device, geographical location of device, or other identifying information specific to the device (e.g. IMEI of a mobile device).

Settings consistent with the present disclosure may allow a user to identify data or files that should not be deleted based on a conditional rule. These settings may allow a user to identify specific memories, zones of memories (i.e. memory blocks), or directories that should or should not be deleted when a conditional rule is enforced.

Data or files that are to be kept or deleted may be associated with one or more attributes that may be used to identify data or files. Such attributes may be included in metadata of particular data or files. These attributes may be used to identify data or files that are associated with a project. Attributes that are used to identify data or files that are associated with project that may be used by a group of individuals when that group of individuals works on the project.

GUIs consistent with the present disclosure may be used by a user to identify a range. A range may be defined by the user selecting two points in a set or list of data or files or data attributes (e.g. date of creation, size of data, source of data, etc.) and specifying a conditional rule. The conditional rule may allow the user, for example, to specify that all data or files between the two selected points will be deleted when the conditional rule is executed. Alternatively, the conditional rule may allow the user to specify that all data or files between the two selected points will be retained and that the data or files that are outside the bounds of the two specified points will be deleted. In some embodiments, multiple sets of points can be specified simultaneously, which will establish an N-dimensional space where the data within the bounds of said N-dimensional space will either be deleted or retained, based upon the definition of the rule(s).

It should be obvious to those skilled in the art that classifications of data files can go beyond the filtered drop down box methods or command lines that adds more flexibility to even further self-classifications systems, such as Artificial Intelligence could watch data storage of a user over time and suggest classifications, such as, classify by time viewing documents, amount of times a document was emailed and so on. In this way, automatic classification based upon related context is possible.

Figure 9:
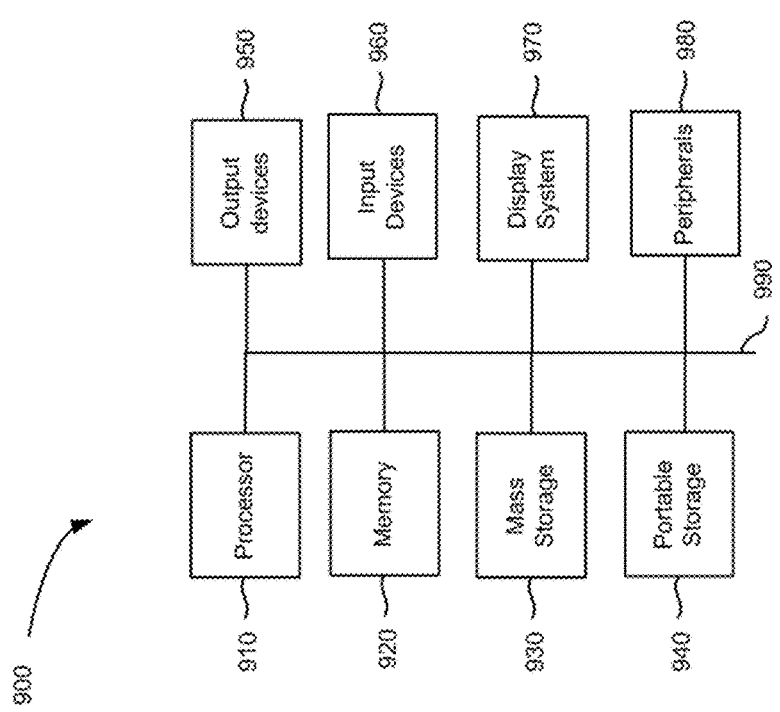
FIG. 9 is a block diagram of an exemplary system for implementing a computing device.

FIG. 9 is a block diagram of an exemplary system for implementing a computing device. The computing system 900 of FIG. 9 includes one or more processors 910 and memory 920. Main memory 910 stores, in part, instructions and data for execution by processor 910. Main memory 920 can store the executable code when in operation. The system 900 of FIG. 9 further includes a mass storage device 930, portable storage medium drive(s) 940, output devices 950, user input devices 960, a graphics display 970, and peripheral devices 980.

The components shown in FIG. 9 are depicted as being connected via a single bus 990. However, the components may be connected through one or more data transport means. For example, processor unit 910 and main memory 920 may be connected via a local microprocessor bus, and the mass storage device 930, peripheral device(s) 980, portable storage device 940, and display system 970 may be connected via one or more input/output (I/O) buses or connection methodologies.

Mass storage device 930, which may be implemented with a magnetic disk drive or an optical disk drive, a solid-state storage device, or other method, is a nonvolatile storage device for storing data and instructions for use by processor unit 910. Mass storage device 930 can store the system software for implementing embodiments of the present invention for purposes of loading that software into main memory 920.

Portable storage device 940 operates in conjunction with a portable nonvolatile storage medium, such as a floppy disk, compact disk or Digital video disc, memory stick (thumb drive), or other, to input and output data and code to and from the computer system 900 of FIG. 9. The system software for implementing embodiments of the present invention may be stored on such a portable medium and input to the computer system 900 via the portable storage device 940.

Input devices 960 provide a portion of a user interface. Input devices 960 may include an alpha-numeric keypad, such as a keyboard, for inputting alpha-numeric and other information, or a pointing device, such as a mouse, a trackball, stylus, cursor direction keys, a user's voice, a user's finger or stylus (for a touch screen), a game controller, a TV remote control device, gesture control, or other types of user input. Additionally, the system 900 as shown in FIG. 9 includes output devices 950. Examples of suitable output devices include speakers, printers, network interfaces, and monitors or display systems.

Display system 970 may include a liquid crystal display (LCD) or other suitable display device. Display system 970 receives textual and graphical information, and processes the information for output to the display device.

Peripherals 980 may include any type of computer support device to add additional functionality to the computer system. For example, peripheral device(s) 980 may include a modem or a router.

The components contained in the computer system 900 of FIG. 9 are those typically found in computer systems that may be suitable for use with embodiments of the present invention and are intended to represent a broad category of such computer components that are well known in the art. Thus, the computer system 900 of FIG. 9 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, iOS, Android and other suitable operating systems.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for organizing data elements, the method comprising:
   receiving user input at a user device, the received user input identifying a type of data element having at least a range, a time, and a plurality of classification levels, wherein the received input corresponds to a rule;
   identifying one or more data elements that correspond to the type of data element, the one or more data elements received from at least one computing device from a plurality of computing devices;
   performing an analysis by a processor at the user device that associates the one or more data elements that correspond to the type of data element and the corresponding rule, the analysis including counting data items or files associated with the rule and a report that summarizes the rules, wherein information relating to the association is persistently stored after the processor performs the analysis;
   generating a visualization from the persistently stored information and relating to at least one data element identified according to the rule, wherein the visualization organizes the at least one data element identified according to the rule based on the type of data element, the range, the time, and the plurality of classification levels; and
   displaying the generated visualization on a display, the visualization identifying that the at least one data element resides at the at least one computing device of the plurality of computing devices.

2. The method of claim 1, wherein the received user input is formatted as a command line with an if-then statement.

3. The method of claim 1, wherein one or more classification metrics correspond to the rule.

4. The method of claim 3, wherein the one or more classification metrics classify the one or more data elements by at least one of a location, content included in a data element, a sender associated with the at the least one data element, or by text entered by the user over the user interface.

5. The method of claim 3, wherein the one or more classification metrics classify the one or more data elements by at least one of a range of dates, an email address, an address, a reference number, or by a range of reference numbers.

6. The method of claim 1, wherein at least two classification levels of the plurality of classification levels include a primary classification level and a secondary sub-classification level.

7. The method of claim 1, wherein the rule is persistently stored at the at least one external computing device or at one or more other computing devices.

8. A non-transitory computer readable storage medium having embodied thereon a program for implementing a method for classifying information, the method comprising:
   receiving user input, the received user input identifying a type of data element having at least a range, a time, and a plurality of classification levels, wherein the received input corresponds to a rule;
   identifying one or more data elements that correspond to the type of data element, the one or more data elements is received from at least one computing device from a plurality of computing devices;
   performing an analysis that associates the one or more data elements that correspond to the type of data element and the corresponding rule, the analysis including counting data items or files associated with the rule and a report that summarizes the rules, wherein information relating to the association is persistently stored after the analysis is performed;
   generating a visualization from the persistently stored information and relating to at least one data element identified according to the rule, wherein the visualization organizes the at least one data element identified according to the rule based on the type of data element, the range, the time, and the plurality of classification levels; and displaying the generated visualization on a display, the visualization identifying that the at least one data element resides at the at least one computing device of the plurality of computing devices.

9. The non-transitory computer readable storage medium of claim 8, wherein the received user input is formatted as a command line with an if-then statement.

10. The non-transitory computer readable storage medium of claim 8, wherein one or more classification metrics correspond to the rule.

11. The non-transitory computer readable storage medium of claim 10, wherein the one or more classification metrics classify the one or more data elements by at least one of a location, content included in a data element or file, a sender associated with the at least one data element, or by text entered by a user over the user interface.

12. The non-transitory computer readable storage medium of claim 10, wherein the one or more classification metrics classify the one or more data elements by at least one of a range of dates, an email address, an address, a reference number, or by a range of reference numbers.

13. The non-transitory computer readable storage medium of claim 8, wherein at least two classification levels of the plurality of classification levels include a primary classification level and a secondary sub-classification level.

14. The non-transitory computer readable storage medium of claim 8, wherein the rule is persistently stored at the at least one external computing device or at least one or more other computing devices.

15. An apparatus for classifying information, the apparatus comprising:
a memory;
a processor; and
a display that receives user input over a user interface displayed on the display, wherein the received user input identifies a type of data element type having at least a range, a time, and a plurality of classification levels, the received input corresponding to a rule and the processor executes instructions out of the memory to identify one or more data elements that correspond to the type of data element; and
a network interface that receives the one or more data elements from at least one computing device, wherein the processor:
performs an analysis that associates the one or more data elements that correspond to the type of data element and to the corresponding rule, the analysis including counting data items or files associated with the rule and a report that summarizes the rules, wherein information relating to the association is persistently stored after the analysis is performed, and
generates a visual from the persistently stored information relating to at least one data element identified according to the rule, wherein:
the visualization organizes the at least one data element identified according to the rule based on the type of data element, the range, the time, and the plurality of classification levels,
the generated visualization is displayed on the display, and
the visualization identifies that the at least one data element resides at the at least one computing device of the plurality of computing devices.

16. The method of claim 1, wherein the information relating to the at least one identified data element of the data element type is received from a plurality of computing devices and the visualization displayed on the display includes an amount of memory consumed at each respective computing device of the plurality of computing devices associated with the at least one data element of the data element type.

17. The method of claim 1, wherein the at least one data element is deleted at the at least one computing device based on the rule when the rule is a conditional delete rule.

18. The method of claim 1, wherein the at least one identified data element is classified according to one or more additional user inputs.

19. The method of claim 18, wherein the one or more additional user inputs classify the at least one identified data element or identify classifications for new data elements of the data element type.

* * * * *